No. 635,239. Patented Oct. 17, 1899.
B. DALLIN.
CHURN.
(Application filed Apr. 22, 1899.)
(No Model.)
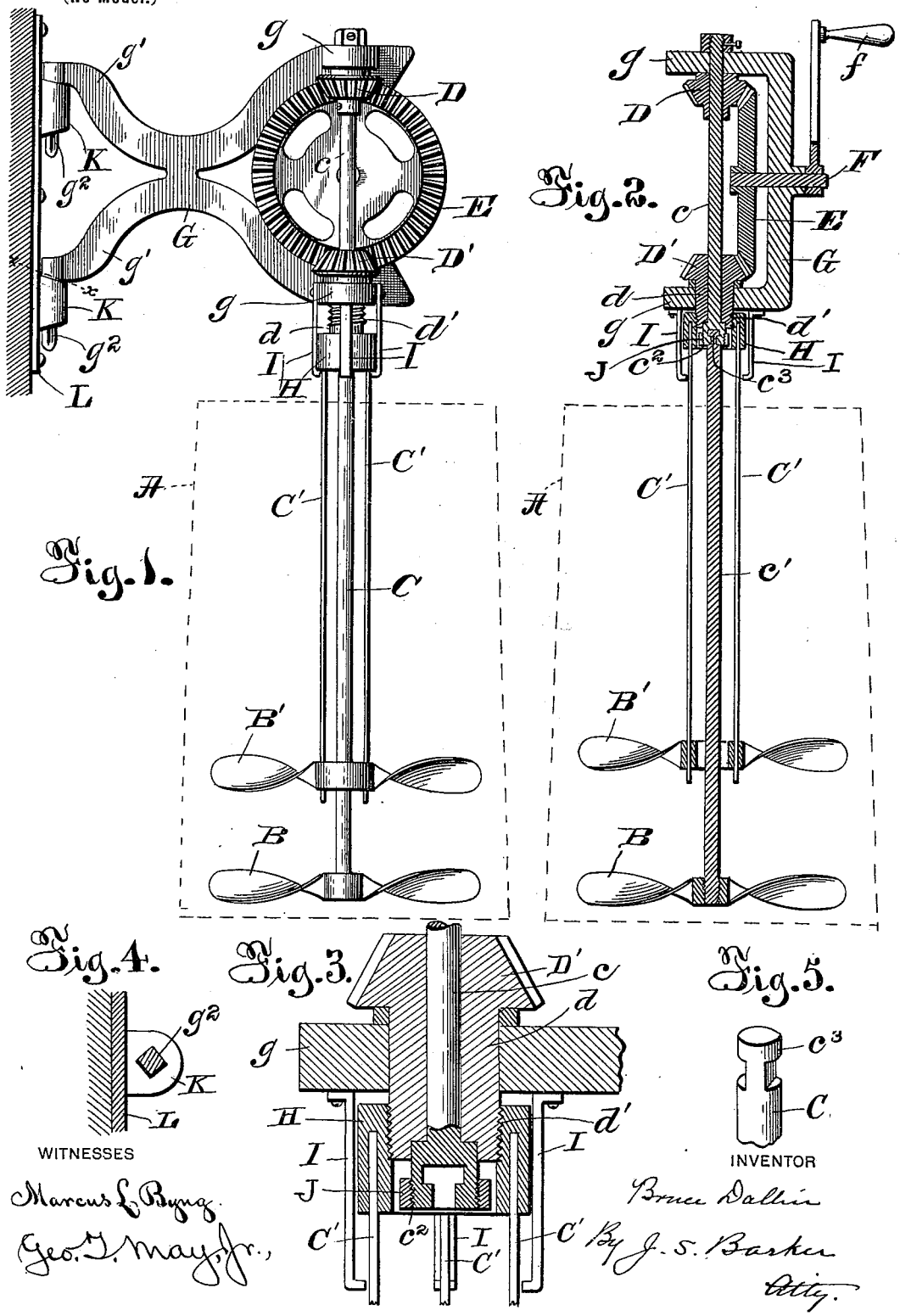
WITNESSES
Marcus L. Byng.
Geo. T. May, Jr.
INVENTOR
Bruce Dallin
By J. S. Barker
Atty.
THE NORRIS PETERS CO., PHOTO-LITHO., WASHINGTON, D. C.

UNITED STATES PATENT OFFICE.

BRUCE DALLIN, OF GAINESVILLE, TEXAS, ASSIGNOR TO GEORGE W. WOMACK, OF SAME PLACE.

CHURN.

SPECIFICATION forming part of Letters Patent No. 635,239, dated October 17, 1899.

Application filed April 22, 1899. Serial No. 714,006. (No model.)

*To all whom it may concern:*

Be it known that I, BRUCE DALLIN, a citizen of the United States, residing at Gainesville, in the county of Cooke and State of Texas, have invented certain new and useful Improvements in Churns, of which the following is a specification.

My invention relates to churns of that style in which the agitation of the milk is produced by means of rotary dashers mounted upon vertically-disposed shafts; and it consists in improvements in the means for supporting and operating the said dashers.

In the drawings, wherein the preferred embodiment of my invention is disclosed, Figure 1 is an elevation of the improvements, the churn-body being in section. Fig. 2 is a vertical section taken on the line 2 2 of Fig. 1. Fig. 3 is a vertical section, enlarged, of a part of the driving mechanism. Fig. 4 is a sectional view of the holding-bracket, taken on the line $x$ $x$ of Fig. 1. Fig. 5 is an enlarged detail of the end of the inner driving-shaft.

In the drawings, A represents the body of the churn.

B B' represent the dashers, which I prefer to make of propeller-blade shape. These are mounted upon vertically-disposed and concentrically-arranged shafts C and C', which in turn are provided with beveled pinions D and D', arranged to be simultaneously rotated in opposite directions by a driving-gear E. This gear is mounted upon a shaft F, which carries an operating-handle $f$, and the entire driving mechanism is mounted in suitable bearings formed in a supporting-bracket G. The upper portion of the shaft of the lower dasher B passes concentrically through the pinion D', which drives the upper dasher B' and turns freely therein. The hub $d$ of the pinion D' is relatively large in cross-section and extends some distance below its bearing $g$ in the bracket G and is provided at its lower end with an external screw-thread $d'$. A ring H, to which are secured the upper ends of the shafts C' that carry the dasher B', engages with the said screw-threaded part $d'$ of the hub of the pinion D', and thus serves as a detachable coupling or union between the upper dasher B' and its driving mechanism. The thread at $d'$ is right-handed, so that when the crank-handle $f$ is turned in the usual direction for operating the churn the tendency is to screw the ring upon the hub of the pinion; but should the operating mechanism be reversed the ring H is unscrewed and the dasher B' thus disconnected from its driving mechanism.

I I represent hooks secured to the bearing $g$ and operating as hangers to support the ring H, the shafts C', and dasher B' when they are disengaged from their driving-pinion D'. The hooks I are of such length that they catch the ring and hold it a short distance below the hub $d$ of the pinion, in which position the upper dasher is suspended, so as in no wise to interfere with the free operation of the lower dasher, and itself remains stationary, notwithstanding its driving-pinion may be turned. The advantages incident to this construction I will here describe. The propeller-like dashers have their blades so pitched that they agitate the cream and produce currents therein in opposite directions, the lower dasher tending to force the milk upward and the upper dasher to force it downward. This arrangement has been found most efficient in operation, tending to the rapid separation of the butter from the other constituents of the cream and milk. This thorough agitation, which tends to the separation of the butter masses, also serves to retard the rapid gathering of the butter in mass, and in order to facilitate this last operation after the butter has "come" I disconnect the upper dasher, as by a few backward turns of the handle $f$, and permit it to rest upon the hangers I and then continue the agitation of the milk with the lower dasher alone. This dasher, since it tends to force the milk and particles carried thereby upward, operates to collect and gather the butter rapidly in the upper part of the churn-body.

I prefer that the shaft which carries the lower dasher should be made in two parts, which may be united by a separable coupling or union. I prefer that the upper portion $c$ of the shaft should terminate just below the hub $d$ of the pinion D', where it is preferably enlarged and formed into a head $c^2$. The lower section $c'$ of the shaft C is provided with a tenon $c^3$ at its upper end, adapted to fit into a correspondingly-shaped socket in the head $c^2$ of the upper section of the shaft. In order to hold the tenon securely in its socket during the operation of the churn, I preferably employ a confining-ring J, which encircles the head $c^2$ and closes the opening into the socket. The ring may be secured in place in any desired way, as by screw-threads or by other well-known means.

I prefer that the bracket G, which supports the driving mechanism for the churn, should be provided with arms $g'$, which carry angular pins $g^2$, which are adapted to fit into socket-pieces K, carried by a plate or support L, adapted to be attached to a wall or other permanent support.

After the churning operation is completed the dasher B and the lower part $c'$ of its supporting-shaft and the dasher B' and its supporting-shafts may be removed from their driving mechanism close to the bracket G, as is apparent from the foregoing description and an inspection of the drawings. This permits of their being easily removed and cleansed without disturbing the heavier driving mechanism. The latter, supported by the bracket G when not in use, may be swung close to the wall, being thus out of the way until again required for use. By making the pins $g^2$ angular and fitting them into sockets shaped to fit such pins the bracket is rigidly held either in an extended position, projecting out from the wall, as is necessary when the churn is in use, or else may be moved against the wall and there held firmly in a position out of the way.

The apparatus which I have described and which embodies the several features of my invention is one simple in construction, the parts being so constructed and arranged as to permit of their ready assembling and disassembling, as occasion may require, and at the same time permitting of an operation most advantageous in the art of churning—that is to say, first agitating the milk and cream with a double set of dashers and then gathering the butter by the use of one set of dashers alone.

What I claim, and desire to secure by Letters Patent, is—

1. In a churn, the combination with the driving mechanism, of a pair of dashers, one of said dashers being vertically movable relative to its driving mechanism to disconnect it therefrom, means for disconnecting said dasher, and a hanger for sustaining said dasher when disconnected, substantially as set forth.

2. In a churn, the combination of a pair of dashers mounted upon vertical shafts, driving means for said shafts comprising a gear and pinions, means for separating one of said shafts from its driving-pinion, whereby the dasher is thrown out of action, while the pinion continues its movements, and sustaining means for said disconnected shaft, substantially as set forth.

3. In a churn, the combination of a pair of dashers mounted upon vertically-disposed shafts, means for simultaneously rotating the dashers, a detachable connecting-ring, H, by which one of the dashers is united with its driving means, and hooks, I, adapted to engage with the said ring and sustain the dasher after it has been disconnected, substantially as set forth.

4. The combination of a supporting-bracket, a driving-wheel, E, mounted therein, pinions D, D', meshing with said wheel, the hub of the pinion D' being provided with an exterior screw-thread, $d'$, the upper dasher, a ring, H, adapted to engage with the screw-threaded part of the hub of the pinion D' and serving to detachably unite the said dasher with its driving mechanism, the hooks, I, carried by the bracket adapted to sustain the upper dasher when disconnected from its driving mechanism, the lower dasher B, the two-part shaft between the dasher B and its driving-pinion, D, and the detachable connection between the two parts of said shaft, substantially as set forth.

BRUCE DALLIN.

Witnesses:
W. J. LAWRENCE,
W. L. BLANTIN.